United States Patent [19]

Olsen

[11] Patent Number: 5,258,165

[45] Date of Patent: Nov. 2, 1993

[54] MULTI-TUBE OZONE GENERATOR AND METHOD OF MAKING SAME

[75] Inventor: Douglas L. Olsen, Eden Prairie, Minn.

[73] Assignee: Osmonics, Inc., Minnetonka, Minn.

[21] Appl. No.: 721,280

[22] Filed: Jun. 26, 1991

[51] Int. Cl.⁵ .............................................. B01J 19/12
[52] U.S. Cl. ...................... 422/186.18; 422/186.07
[58] Field of Search ...................... 422/186.07, 186.18, 422/186.19, 186.2; 165/158, 178

[56] References Cited

U.S. PATENT DOCUMENTS

| | | | |
|---|---|---|---|
| 1,840,510 | 1/1932 | Kelley | 165/158 |
| 1,950,211 | 3/1934 | Askin | 165/158 |
| 1,995,768 | 3/1935 | Fesenmaier | 165/178 |
| 3,942,020 | 3/1976 | Ciambrone | 250/539 |
| 4,013,567 | 3/1977 | Emelyanov et al. | 250/540 |
| 4,585,057 | 4/1986 | Marburger | 165/134.1 |
| 4,908,189 | 3/1990 | Staubach | 422/186.19 |

*Primary Examiner*—Donald P. Walsh
*Assistant Examiner*—Daniel Jenkins
*Attorney, Agent, or Firm*—Dorsey & Whitney

[57] ABSTRACT

A multi-tube ozone generator which includes a plurality of ozone generating tubes packed or nested in a close proximity to one another to provide a compact and nested configuration while still providing sufficient cooling passages between the tubes. Each of the tubes is provided with a central portion and an enlarged, flared hexagonal configured end portion which are joined to adjacent flared ends along their mating edges. The present invention also relates to a method for making such an ozone generator.

10 Claims, 2 Drawing Sheets

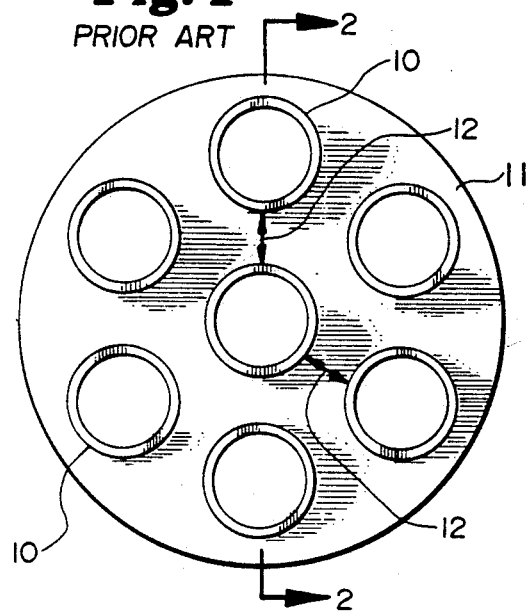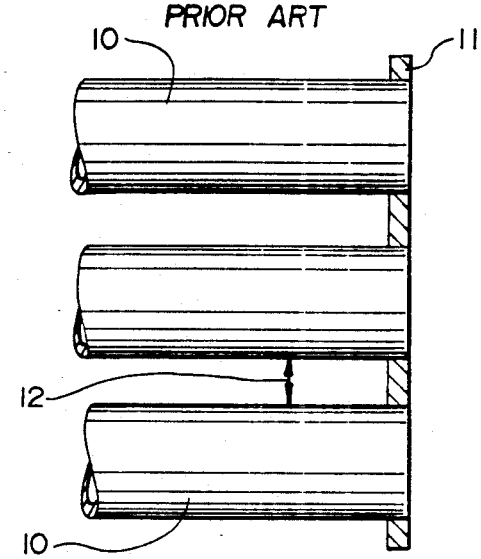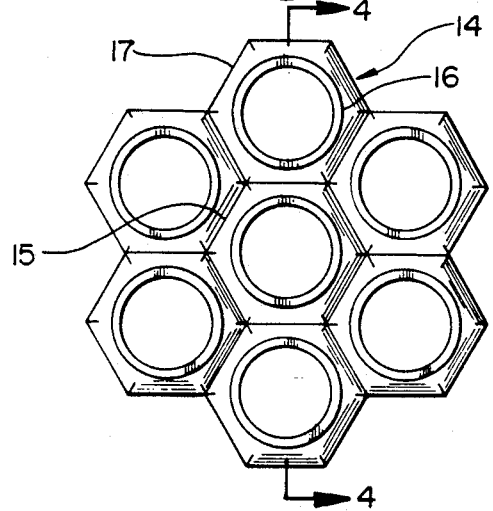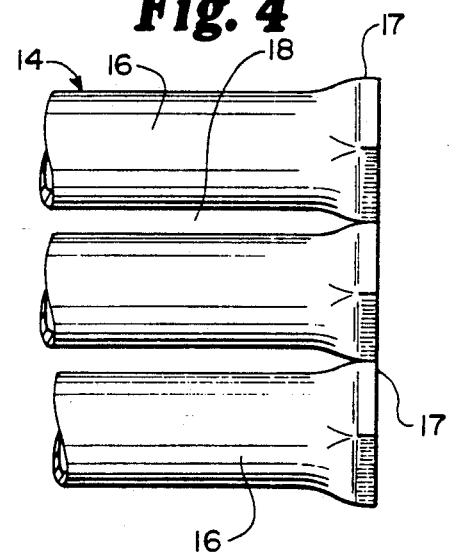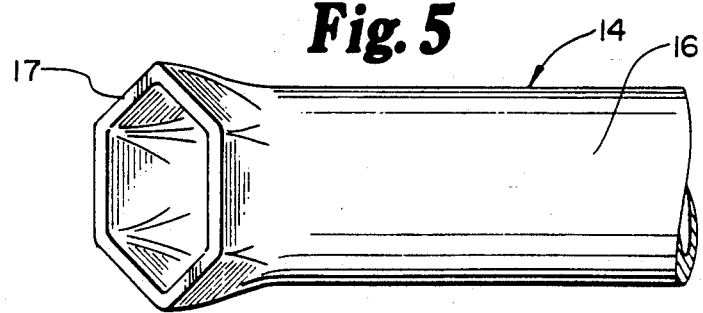

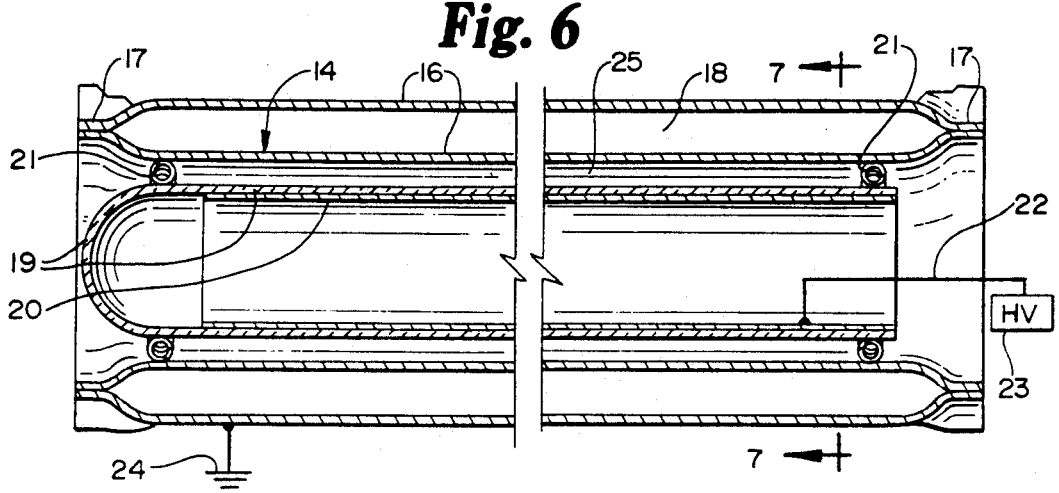
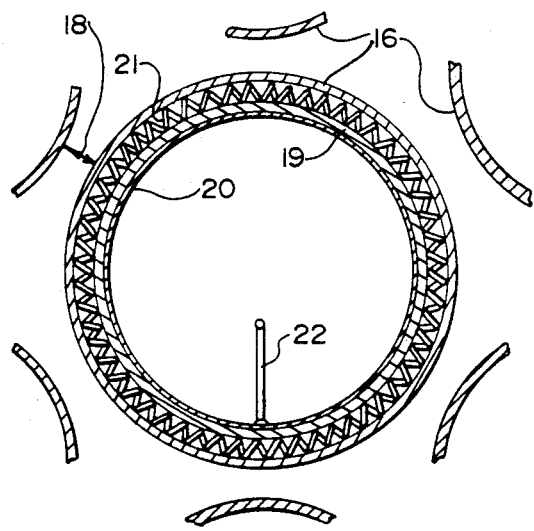
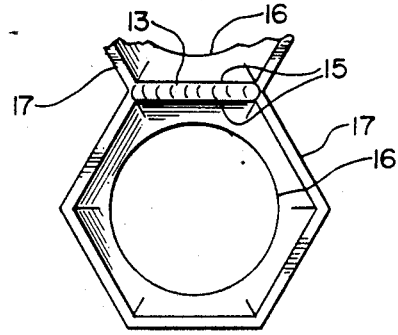
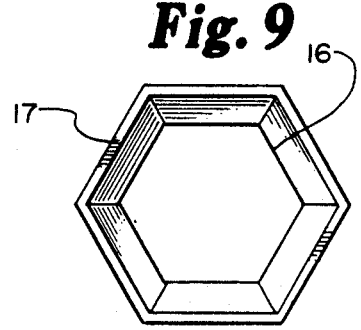

MULTI-TUBE OZONE GENERATOR AND METHOD OF MAKING SAME

BACKGROUND OF THE INVENTION

1. Field of the Invention

The present invention relates generally to an ozone generator and method of making the same, and more particularly, to a multi-tube ozone generator having a tube construction in which the plurality of ozone generating tubes are nested together. The present invention also relates to a method of making the ozone generator by forming the ozone generating tubes and joining the same together in a compact, nested structure.

2. Description of the Prior Art

Ozone ($O_3$) is a powerfully oxidizing allotropic form of oxygen. Because of its high oxidizing properties, it is commonly used, among other things, as a bacteriacide and virus deactivant and is rapidly attaining preeminence in the treatment of air and of drinking and other water supplies. Ozone is also gaining popularity for use in sewage treatment and any other application where the high oxidizing properties of ozone can be utilized.

Ozone does not exist at usable levels naturally, nor is it practically containerized or stored; thus it must be generated commercially, and generally at the location where it is used. The principal method used to generate ozone commercially is to pass gaseous oxygen or air through a high voltage, alternating current electric discharge commonly referred to as a silent arc or corona discharge. During this process, molecular oxygen ($O_2$) disassociates into atomic oxygen in an energizing environment that allows the recombination of atoms into the $O_3$ (ozone) form.

Various ozone generators employing silent arc discharge conditions currently exist in the art. Such generators generally comprise a pair of electrodes separated by a gap, a dielectric material inserted in the gap, gaseous oxygen or air in the gap, and sufficient voltage potential between the electrodes to cause current to flow through the dielectric and the gaseous oxygen or air. The electrodes can be flat, tubular or any configuration which allows opposing electrode surfaces to be parallel. Tubular electrodes are commonly employed in multi-tube generators comprising a plurality of tubes generally arranged in a linear or packed configuration. Although it is desirable to pack the plurality of tubes in a multi-tube generator as close as possible while still allowing sufficient space between the tubes for cooling purposes, the compactability of currently existing multi-tube ozone generators has been limited by the manner in which such generators are constructed.

In one typical prior art ozone generator, a plurality of individual ozone generating tubes are supported by a tube sheet or end plate which contains a plurality of openings to accommodate the ends of the tubes. During construction, the ends of the plurality of tubes are positioned in the openings of the end plate and secured thereto by swedging. With such a structure, it is necessary for a certain minimum distance to exist between the holes in the end plate to provide sufficient strength to support the tubes. If the openings to which the tubes are joined are too close together, the end plate will not be sufficiently strong to support the swedging of adjacent tubes without loosening other joints. Accordingly, the extent to which the plurality of tubes in such a structure can be packed or nested relative to one another is limited.

In a further multi-tube ozone generator described in U.S. Pat. No. 5,009,858 issued to Mechtersheimer, a plurality of tubes are packed into a housing in which the intermediate spaces between the tubes are filled with a thermally conductive material. Another multi-tube ozone generator is illustrated in U.S. Pat. No. 4,960,570 also issued to Mechtersheimer in which the plurality of tubes are arranged linearly between a pair of spaced metal plates.

Although various multi-tube generators currently exist in the air, there is a continuing need for a multi-tube generator which provides maximum nesting of the plurality of ozone generating tubes, while still maintaining sufficient spacing between such tubes to provide cooling.

SUMMARY OF THE INVENTION

The present invention relates to a multi-tube ozone generator and method of making the same and includes a structure which facilitates the nesting of the plurality of tubes of the generator and thus provides a more compact and efficient configuration. The structure of the ozone generator of the present invention eliminates the tube sheet or end plate which is common in many prior art ozone generators for supporting the plurality of the tubes. Instead, the ends of the tubes are flared or expanded into a hexagonal shaped configuration for connection to the flared or expanded ends of adjacent tubes by welding or other connection means. Such a structure enables the tubes to be nested together, thereby resulting in a more efficient packing of the tubes and a reduction of overall size of the generator, while still maintaining sufficient spacing between the central portions of individual tubes to facilitate the passage of a cooling fluid. The extent of spacing between the central portions of the tubes is controlled by the extent to which the end portions of the tubes are flared.

The preferred embodiment contemplates a plurality of generally cylindrical tubes in which each is flared at its ends into a hexagonal configuration. The tubes are then joined to one another in a packed configuration by joining the mating edges of adjacent hexagonal configurations by welding or the like. Such a structure provides structurally strong and compact and nested arrangement of the individual tubes while also providing sufficient support for the tubes and sufficient spacing between the tubes for the passage of cooling fluids.

The preferred method of the present invention includes flaring or enlarging the ends of each of the plurality of tubes into a hexagonal configuration and joining the flared hexagonal ends along their corresponding mating edges to form a compact, nested configuration of the ozone generator.

Accordingly, it is an object of the present invention to provide a multi-tube ozone generator which facilitates maximum nesting of the tubes relative to one another, while still maintaining sufficient cooling passages therebetween.

A further object of the present invention is to provide a multi-tube ozone generator in which each of the tubes includes a tubular central portion and a flared or enlarged end for connection with adjacent tubes.

Another object of the present invention is to provide a multi-tube ozone generator in which each tube is a generally cylindrical tube with a circular cross-sectional configuration and in which each end of the individual tubes is flared into a hexagonal configuration for connection to adjacent tubes.

A still further object of the present invention is to provide a method for making a multi-tube ozone generator of the type described above.

These and other objects of the present invention will become apparent with reference to the drawings, the description of the preferred embodiment and method and the appended claims.

DESCRIPTION OF THE DRAWINGS

FIG. 1 is an end, elevational view of a prior art ozone generator configuration with the ozone generating elements eliminated for purpose of clarity.

FIG. 2 is a sectional side view of the prior art ozone generator of FIG. 1 as viewed along the section line 2—2 of FIG. 1.

FIG. 3 is an end, elevational view of the ozone generator configuration of the present invention with the ozone generating elements eliminated for purposes of clarity.

FIG. 4 is a sectional side view of the ozone generator of the present invention as viewed along the section line 4—4 of FIG. 3.

FIG. 5 is a perspective, fragmentary view showing a flared end of an individual ozone generating tube configuration in accordance with the present invention.

FIG. 6 is a sectional side view of an individual ozone generating tube in accordance with the present invention showing the ozone generating elements within the tube.

FIG. 7 is a sectional, end view of the ozone generating tube of FIG. 5 as viewed along the section line 7—7 of FIG. 5.

FIG. 8 is an enlarged end view of a portion of the tube structure showing connection between adjacent tubes.

FIG. 9 is an end view showing an alternate configuration for an ozone generating tube.

DESCRIPTION OF THE PREFERRED EMBODIMENT AND METHOD

The understanding and description of the preferred embodiment and method of the present invention disclosed in FIGS. 3–8 is assisted by first describing and understanding the prior art structure illustrated in FIGS. 1 and 2.

The prior art ozone generator illustrated in FIGS. 1 and 2 includes a plurality of elongated cylindrical metal tubes 10 which are supported at their ends by tube sheet or end plate 11. In many prior art structures, the end plates 11 comprise a generally circular piece of metal having a plurality of holes to accommodate the ends of the tubes 10. During construction, the ends of the tubes 10 are forced into the openings of the end plate 11 or are otherwise connected thereto by swedging or the like. With this structure, it is necessary for a certain minimum distance 12 to exist between the holes in the tube sheet to provide sufficient strength to allow the connection technique and for supporting the tubes 10. If the openings are too close together, the end plate 11 will not be sufficiently strong to support the tubes 10. Accordingly, in the prior art structure of FIGS. 1 and 2, a certain minimum distance 12 is needed between the various tubes. This required distance 12 necessarily limits the extent to which the tubes 10 can be packed or nested relative to one another.

The general structure of the ozone generator of the present invention is best understood with reference to FIGS. 3, 4 and 5. FIG. 3 is a view similar to that of FIG. 1, but which illustrates the plurality of ozone generating tubes 14 configured in accordance with the present invention. The ozone generator of the present invention includes a plurality of tubes 14 joined together in a nested configuration. Each of the individual tubes 14 includes a generally elongated tubular central portion 16 and a flared or enlarged end portion 17. In the preferred embodiment, each end of the plurality of tubes 14 is flared or enlarged into a hexagonal configuration 17 so that the mating edges 15 of the hexagonal configuration 17 can be connected to adjacent tubes in a configuration such as that illustrated in FIGS. 3 and 4.

For the reasons described in greater detail below, the preferred configuration of the central portion 16 of the tubes is that of a circular cross-sectional configuration. This is the most practical configuration for maintaining a constant gap size between the pair of electrodes, although it is contemplated that other configurations can possibly be employed as well. Further, the tubes 14 are formed from a conductive material and preferably a metallic material such as stainless steel. The thickness of the tubes 14 of the present invention is about 0.065 inches.

In the preferred embodiment, the mating edges 15 of the flared hexagonal ends 17 of each tube are joined with the mating edge 15 of an adjacent tube in the manner illustrated in FIGS. 3 and 8. Preferably, this connection is a connection by welding or the like, although it is contemplated that other possible means including rolling, crimping, bonding, etc. may also be considered.

The area between the central portions 16 of adjacent tubes 14 define cooling passages 18 for a cooling fluid. Thus, it is preferable for the connection between mating edges 15 of the hexagonal ends to be sufficient to form a seal for such passages while the concept of the present invention can be used to make multi-tube generators having any number of individual tubes, the most compact configurations are multi-tube generators having 7, 19, 37, 61, 91 or more tubes. For generators with the number of tubes being greater than 91, the most compact configurations are those which have additional tubes equal to the difference between the two most compact configurations having the next greatest number of tubes, plus six.

A further requirement of the present invention is that the cross-sectional area of the flared or enlarged ends 17 be greater than the cross-sectional area of the central portion 16 of the tubes. This facilitates the formation of the cooling fluid passages 18 between the central portions 16 of adjacent tubes 14.

FIGS. 6 and 7 are sectional side and end views of a single tube in accordance with the present invention illustrating the details of the ozone generating elements. As illustrated in the structure of FIGS. 6 and 7, the interior of each of the tubes 14 is provided with a dielectric 19 in the form of a closed end glass or ceramic tube 19, an inner electrode 20 in the form of a metalic foil, a centering mechanism 21 for centering the dielectric tube 19 and a high voltage lead 22.

In the ozone generator of the present invention, the tubular members 14, and in particular the central portions 16, form one of the electrodes in the ozone generating system, while the conductive foil electrode 20 forms the other. In the preferred embodiment, the tube 14 serves as the grounded electrode which is connected with a ground 24, while the foil electrode 20 within the dielectric 19 is connected by an appropriate lead 22 to a high voltage source 23. Preferably, the foil electrode 20 is in close proximity to the inner surface of the dielectric 19 so as to be in relatively constant spaced relationship with the central portion 16 of the tube. This defines a gap 25 of constant size between the electrodes 16 and 20. A dielectric centering device 21 is provided between the outer surface of the dielectric tube 19 and the inner surface of the tube 14 to maintain a consistent space or gap 25 between such surfaces, and thereby insure relatively constant spacing between the electrodes 16 and 20. Spacing devices 21 are common in the art and conventionally include a spacing spring or other member which insures consistent spacing while also permitting free flow of gas through the gap 25. It is contemplated, however, that the centering mechanism 21 could be constructed of a molded plastic material. Preferably, the centering device should be nonmetalic so as not to interfere with the voltage potential between the electrodes 16 and 20. However, if it is metalic, it should be sufficiently spaced from the high voltage electrode 20 so as to preclude arcing or other interference.

As indicated above, the preferred embodiment contemplates the central portion 16 of each tube to have a generally circular cross-sectional configuration; however, it is possible to employ other cross-sectional configurations as well. For example, FIG. 9 shows a tubular construction with a central portion 16 having a generally hexagonal configuration. With this structure, it is desirable for the dielectric 19 as well as the inner, high voltage electrode 20 to have a hexagonal configuration so as to maintain a relatively constant gap between the two electrodes. Thus, although it is required for the flared ends to have a generally hexagonal configuration, the central portion 16 of the tubes can be of circular or various other configurations provided the cross-sectional area of the central portions 16 is smaller than the cross-sectional area of the flared end 17. This assures the existence of cooling fluid passages between the central portions of adjacent tubes.

Although not specifically illustrated, but common structure in prior art ozone generators and known in the art is a chamber or manifold on each end of the generator for the purpose of introducing air or molecular oxygen into one end of the generator and recovering ozone at the other. It is also contemplated that the generator of the present invention would include means well known in the ozone generator art for supplying a cooling fluid such as water, glycol or the like through the cooling passages 18.

The operation of the ozone generator of the present invention is illustrated best with reference to FIGS. 6 and 7. During such operation, molecular oxygen or air is provided at one end of the tubular configuration and caused to flow through the gap 25 between the electrodes 20 and 16 from one end of the generator to the other. During such passage through the gap 25, the oxygen or oxygen in the air is subjected to the high voltage potential between the electrodes 20 and 16. This causes molecular oxygen to be converted to ozone ($O_3$) in a manner known in the art. The flow rate of oxygen or air thorugh the system in order to achieve optimum conversion is also known in the art.

The method of the present invention includes enlarging or flaring each end of a plurality of tubes into a hexagonal configuration and then connecting the mating edges of the flared ends of adjacent tubes to one another to form a compact, nested structure. As indicated above, this connection is preferably a connection such as welding or the like in which the mating edges form a seal to define the cooling passages 18. In the preferred method, the flared ends are formed by inserting a plug having a hexagonal outer configuration and forcing the same into the generally cylindrical tube, thereby causing the ends to be flared into the hexagonal configuration. It is contemplated, however, that other means for flaring the ends could be utilized as well. Further, the preferred embodiment shows both tube ends flared; however, there may be applications in which only one end is flared.

Although the description of the preferred embodiment and method have been quite specific, it is contemplated that various modifications could be made without deviating from the spirit of the present invention. Accordingly, it is intended that the scope of the present invention be dictated by the appended claims, rather than by the description of the preferred embodiment.

I claim:

1. A multi-tube ozone generator comprising:
    a plurality of ozone generating tubes, each constructed of an electrically conductive material and forming a first electrode and each including a central tubular portion and an enlarged hexagonal shaped end having a cross-sectional area greater than the cross-sectional area of said central tubular portion, wherein said hexagonal end defines a plurality of mating edges and said tubes are joined to one another along corresponding mating edge;
    a second electrode positioned within each of said tubes and spaced inwardly from said first electrode; and
    a dielectric member positioned within each tube and between said first and second electrodes.

2. The ozone generator of claim 1 wherein said central tubular portion is elongated.

3. The ozone generator of claim 1 wherein said central tubular portion has a generally circular cross-sectional configuration.

4. The ozone generator of claim 1 wherein each of said tubes includes a weld joint along corresponding edges of said hexagonal shaped ends of adjacent tubes.

5. The ozone generator of claim 1 wherein said ozone generating means includes a centering means for centering said dielectric member within said central tubular portion.

6. The ozone generator of claim 5 including means for connecting one of said first and second electrodes to a high voltage source.

7. The ozone generator of claim 1 wherein the central tubular portions of adjacent tube are spaced from one another to define a cooling fluid passage between adjacent tubes.

8. The ozone generator of claim 1 wherein the number of ozone generating tubes is equal to 7, 19, 37, 61 or 91.

9. The ozone generator of claim 1 wherein each end of said tubes includes an enlarged hexagonal shaped end.

10. The ozone generation of claim 1 wherein each of said tubes is parallel to one another.

* * * * *